Aug. 21, 1956 J. T. ROBERTS 2,759,353
PLASTOMETER MACHINE
Filed Dec. 19, 1952 2 Sheets-Sheet 1
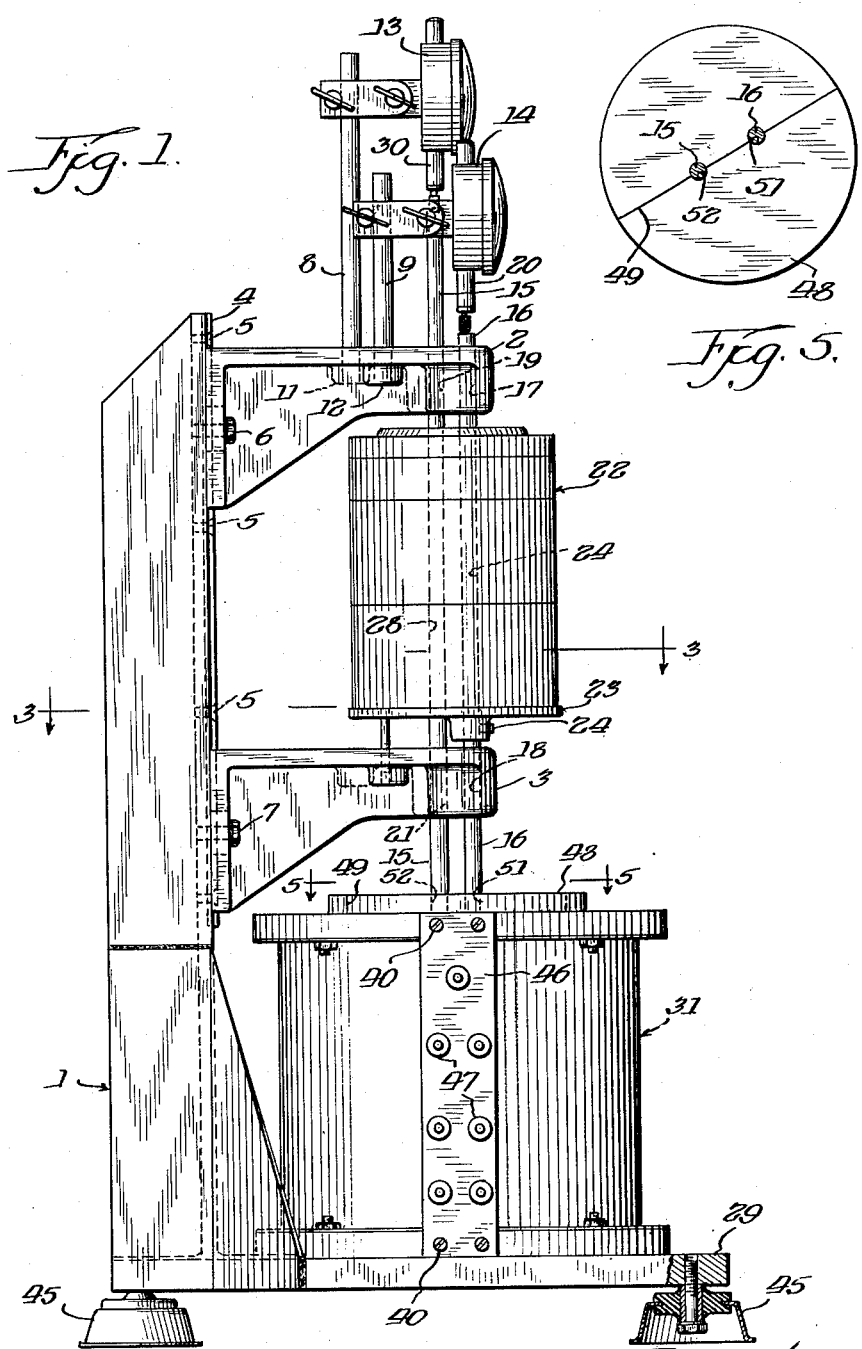
Inventor:
John T. Roberts.
By Joseph O. Lange
Atty.

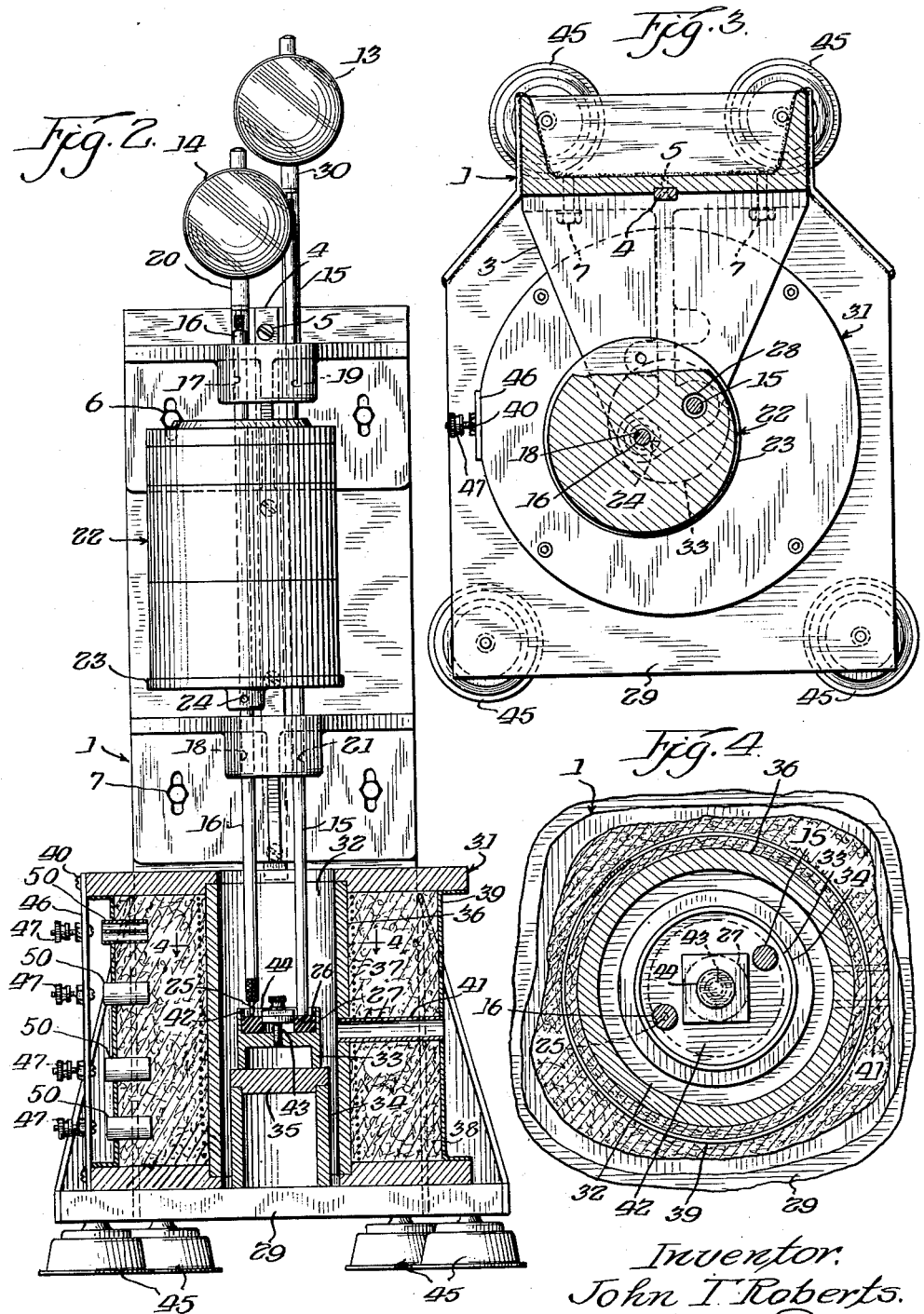

United States Patent Office 2,759,353
Patented Aug. 21, 1956

2,759,353

PLASTOMETER MACHINE

John T. Roberts, Glen Ellyn, Ill., assignor to Crane Co., Chicago, Ill., a corporation of Illinois Application December 19, 1952, Serial No. 326,897

1 Claim. (Cl. 73—16)

This invention relates broadly to a testing machine, and, more specifically, it pertains to an improved type of machine termed by those skilled in the art as a plastometer. It is useful in measuring the hot flow characteristics, such as hot indentation hardness, softening point, the expansion, contraction, thermal stability, and the like, of a material or compound or an object comprising same over a comparatively wide range of temperatures, as, for example, from atmospheric or even subatmospheric temperatures, say 50 to 100 degrees below zero Fahrenheit to advanced temperatures such as those of the order of say 800 or 1200 degrees Fahrenheit.

In order to acquire a more complete and accurate understanding of the background of this invention, it should be realized that heretofore it has been difficult to obtain true readings and impressions of the materials being tested for the determination of the above-mentioned characteristics because the equipment was inadequate. For example, to my knowledge, it was not possible previously to obtain a true and accurate value of hot indentation hardness, which characteristic does not include the expansion or contraction of the test sample itself.

Further, the mechanisms previously employed for the purpose have been relatively complicated and costly, as well as being unable to record clearly the measurement of physical properties referred to.

Therefore, it is one of the more important objects of this invention to provide a plastometer type of testing machine in which at least two or more physical characteristics of the material or the article under test can be measured substantially simultaneously.

Another important object is to provide for a machine in which the application of heat and relatively high temperature may be supplied in a comparatively compact and efficient manner.

A further object is to provide for a machine in which the indicating means are applied close to the test zone, so as thereby to facilitate greater accuracy in the measurement of the physical characteristics of the test specimen or specimens.

A further object is to provide for a testing machine of the character hereinabove referred to in which inspection may be readily made of the test specimen during and after the tests as well as providing for convenient replacement.

Other objects and advantages will become more readily apparent upon proceeding with a description of the device read in light of the accompanying drawings, in which Fig. 1 is a side exterior assembly view of a plastometer type of machine embodying my invention.

Fig. 2 is a front view of the device with a lower portion thereof in section.

Fig. 3 is a fragmentary sectional view taken on the line 3—3 of Fig. 1.

Fig. 4 is a fragmentary sectional view taken on the line 4—4 of Fig. 2.

Fig. 5 is a plan view taken on the line 5—5 of Fig. 1.

Similar reference numerals refer to similar parts throughout the several views.

Referring now to Fig. 1, the plastometer machine embodying my invention comprises essentially a frame, generally designated 1, the frame being provided with transversely extending upper arm 2 and a lower arm 3. Each of these arms is preferably adjustably movable upon a vertical guide portion 4 of the frame 1. It is held in place thereon by means of the screws 5, the arms being independently adjustable by means of bolts 6 and 7 to hold the frames in the desired fixed positions. Upon the upper arm 2, the indicator posts 8 and 9, as shown, are vertically disposed, being threadedly received within the respective bosses 11 and 12 of the arms and upon which are mounted the dial indicators 13 and 14. The latter members are the conventional indicators for recording such transverse movement as hereinafter described at length and may take place relative to the expansion rod 15 or the indentor rod 16, or both. The respective rods 20 and 30 of the dial indicators 14 and 13 provide the necessary contacts with the rods 16 and 15.

It will also be clear that the upper and lower arms 2 and 3 respectively serve as guides, as at 17 and 18 respectively, for guiding the indentor rod 16. At 19 and 21, the upper and lower arms are apertured respectively to journally guide the expansion rod 15. Preferably, in order to provide the desired predetermined load, the indentor rod 16 is arranged to receive the weights generally designated 22, the latter being mounted upon a platform 23 adjustably held to the rod 16 by means of the set screw 24. It will be clear that the weights 22 are carefully selected to provide the necessary load on the point 25 on the indentor rod 16, as will hereinafter be explained in greater detail in its application upon the test sample received within the machine.

At its lower end portion, the expansion rod 15 is preferably formed with a transversely extending flat surface 26 and similarly bears, as illustrated, in abutting relation against the test specimen under investigation. Since it merely measures the expansion of the test specimen which, as in this case, may be a composition valve disc or closure 27, the expansion rod 15 is not necessarily weighted and extends uninterruptedly directly through the superposed weights by means of the common aperture 28 provided within the said weight assembly and extends upwardly therethrough for direct connection with the lower portion 30 of the indicating dial 13.

Supported upon a transversely extending portion 29 of the frame 1, a furnace generally designated 31 is mounted. It is hollow or chambered, as more clearly shown at 32 in Fig. 2, to receive the end portions of the respective expansion rod 15 and indentor rod 16 as well as the test specimen holder 33 and including the capped supporting cylinder 34 provided with the cap 35 for supports and positioning of the holder 33. The furnace inner wall 36 is furnished with a conventional coiled heating element 37. Outwardly beyond the latter element the usual wall or fill comprising an asbestos annular portion 38 is provided with a hollow wall defined by the outer liner 39. A thermocouple insulator strip 41 attached as at 49 to the furnace 31 projects transversely through the respective outer liner and the asbestos said annular fill portion to communicate with the furnace inner chamber 32. Suitably connected to the liner 39 by means of welding or brazing and carrying electric wiring (not shown) to the heating element 37, conventional double-hole round-style insulators 50 are provided, preferably positioned transversely as shown and are secured in place after the liner 38 has been applied to the cylinder 36.

Directing attention to the form of specimen holder used, as designated at 33, the latter member is of hollow form, as at 42, and receives the test specimen 27 as shown more clearly in the cross-sectional view of Fig. 4. Preferably, although not necessarily, a positioning means, such as the screw 43, having a cylindrical portion 44 may be used to maintain the test sample (disc) securely in position and also to accurately record the respective expansion or contraction and the indentation hardness, as required.

It should be clear that in this design the measurement of the expansion or the contraction of a sample of the specimen can be obtained simultaneously with the measurement of penetration. Further, it should be clear that by subtracting or adding to or from the other measurement, it is a relatively simple matter to correct for the above described effect and arrive at a true value for the hot indentation hardness.

Preferably, although not necessarily, the supporting member 29 and frame 1 are mounted upon the resilient plates or legs 45 to properly cushion the device.

In collaboration with the insulators 50, a terminal board 46 electrical connections are mounted on the side of the furnace as indicated, having the binding posts 47 for suitable attachment of the electric wiring and the usual connection with the coil heating element 37 indicated.

In order to maintain the desired heat within the furnace chamber 32, as more clearly shown in Fig. 1, a cover 48 is used. It is of split configuration as at 49 and grooved as at 51 and 52 to receive the indicator rods 15 and 16 respectively. It should be understood that for purpose of greater clarity the cover has been removed from the assembly shown in Fig. 2.

While only a single embodiment has been shown and described, it will, of course, be apparent that a number of modifications may be used falling within the spirit of the invention. It is the desire, therefore, to be limited only by the scope of the appended claim.

I claim:

In a testing machine of the character described for measuring indentation hardness and expansion or contraction of a test specimen, the combination of a frame having upper and lower transversely extending arms, dial indicators mounted on one of the arms, a vertically movable indentor rod, a vertically movable expansion rod, the said latter rods being supported against transverse movement by said arms and having communication at each lower end portion thereof with a test specimen, a weighted member between the said arms, the said rods having upper end limits cooperating with the dial indicators, and means carried by the machine for supporting peripheral edges and walls of the test specimen in the course of testing the specimen.

References Cited in the file of this patent

UNITED STATES PATENTS

| | | |
|---|---|---|
| 1,037,596 | Coppage | Sept. 3, 1912 |
| 1,184,837 | Edgecomb | May 30, 1916 |
| 1,952,523 | Abbott | Mar. 27, 1934 |
| 2,348,782 | Bollee et al. | May 16, 1944 |